United States Patent
Pevy et al.

(10) Patent No.: US 10,356,691 B2
(45) Date of Patent: Jul. 16, 2019

(54) RADIO RELAY

(71) Applicant: Perpetuum Ltd., Southampton (GB)

(72) Inventors: Andrew Paul Pevy, Berkshire (GB); Michael Allum, Andover Hampshire (GB); David Robert Vincent, Ferndown Dorest (GB)

(73) Assignee: PERPETUUM LTD., Southampton (GB)

( * ) Notice: Subject to any disclaimer, the term of this patent is extended or adjusted under 35 U.S.C. 154(b) by 0 days.

(21) Appl. No.: 15/741,077

(22) PCT Filed: Jun. 28, 2016

(86) PCT No.: PCT/EP2016/064934
§ 371 (c)(1),
(2) Date: Dec. 29, 2017

(87) PCT Pub. No.: WO2017/001368
PCT Pub. Date: Jan. 5, 2017

(65) Prior Publication Data
US 2018/0192352 A1    Jul. 5, 2018

(30) Foreign Application Priority Data
Jun. 30, 2015 (GB) .................................. 1511480.4

(51) Int. Cl.
*H04W 40/22* (2009.01)
*H04W 40/24* (2009.01)
(Continued)

(52) U.S. Cl.
CPC ......... *H04W 40/22* (2013.01); *B61L 15/0027* (2013.01); *H04L 45/20* (2013.01); *H04W 40/244* (2013.01); *B61L 27/0005* (2013.01); *B61L 2205/02* (2013.01); *H04W 40/248* (2013.01); *H04W 84/18* (2013.01); *H04W 84/20* (2013.01); *Y02D 70/39* (2018.01)

(58) Field of Classification Search
CPC ............. B61L 15/0027; B61L 2205/02; B61L 27/0005; H04L 45/20; H04W 40/22; H04W 40/244; H04W 40/248; H04W 84/18; H04W 84/20; Y02D 70/39
USPC .......................................................... 370/315
See application file for complete search history.

(56) References Cited

U.S. PATENT DOCUMENTS

2003/0030565 A1* 2/2003 Sakatani ................ G01H 1/003
340/679
2003/0219129 A1* 11/2003 Whelan .................. H04L 9/0891
380/270

(Continued)

FOREIGN PATENT DOCUMENTS

DE      10045810     3/2002
WO      98/42096     9/1998

OTHER PUBLICATIONS

Kook-Hee Han, et al.; A Novel Gradient Approach for Efficient Data Dissemination in Wireless Sensor Networks; IEEE; pp. 2979-2983; 2004.

(Continued)

*Primary Examiner* — Stephen J Clawson
(74) *Attorney, Agent, or Firm* — Colin P. Cahoon; Shaukat A. Karjeker; Carstens & Cahoon, LLP (57) ABSTRACT

A technique comprising: detecting at a first radio node a first signal indicating the number of hops at which a second radio node that transmitted the first signal first detected a second, earlier signal; and deciding whether to transmit said first signal onwards from said first radio node based at least partly on (i) a direction indicator in said first signal, (ii) a comparison of the respective numbers of hops at which said first and second radio nodes first detected said earlier second signal, and (iii) the result of a search at said first radio node for onwards transmission of said first signal by another radio node in the direction indicated by said hop-count number direction indicator.

20 Claims, 5 Drawing Sheets

(51) Int. Cl.
*B61L 15/00* (2006.01)
*H04L 12/733* (2013.01)
*H04W 84/18* (2009.01)
*B61L 27/00* (2006.01)
*H04W 84/20* (2009.01)

(56) References Cited

U.S. PATENT DOCUMENTS

| | | | | |
|---|---|---|---|---|
| 2005/0259598 | A1* | 11/2005 | Griffin | B61L 15/00 |
| | | | | 370/255 |
| 2013/0122917 | A1* | 5/2013 | Yavuz | H04J 3/0638 |
| | | | | 455/450 |
| 2013/0282263 | A1* | 10/2013 | Tee | H04W 40/28 |
| | | | | 701/118 |
| 2015/0066616 | A1* | 3/2015 | Bray | G06Q 30/0214 |
| | | | | 705/14.16 |
| 2018/0302323 | A1* | 10/2018 | Moiseenko | H04L 45/745 |

OTHER PUBLICATIONS

Rajapandiyan Rajendran, et al; An Efficient and Reliable Multi-Hop Geographical Broadcast Protocol in Vehicular Ad-Hoc Networks; International Conference on ITS Telecommunications (ITST); pp. 1-7; 2013.
EP Search and Examination Report dated Dec. 23, 2015; 6 pages.
PCT Search and Examination Report dated Sep. 30, 2016; 11 pages.

\* cited by examiner

Figure 6 ically long inactive intervals.
RADIO RELAY

CROSS-REFERENCE TO RELATED APPLICATIONS

This application is a US 371 application from PCT/EP2016/064934 filed Jun. 28, 2016, which claims priority to GB Application 1511480.4 filed Jun. 30, 2015, the technical disclosures of which are hereby incorporated herein by reference.

TECHNICAL FIELD

Radio transmissions are increasingly being used for the transfer of data.

Some radio networks require relatively high levels of centralised management to transfer data across the radio network. The inventors for the present application have identified the challenge of developing a technique requiring less network management complexity.

BACKGROUND OF THE INVENTION

There is hereby provided a method comprising: detecting at a first radio node a first signal indicating the number of hops at which a second radio node that transmitted the first signal first detected a second, earlier signal; and deciding whether to transmit said first signal onwards from said first radio node based at least partly on (i) a direction indicator in said first signal, and (ii) a comparison of the respective numbers of hops at which said first and second radio nodes first detected said earlier second signal.

INVENTION DISCLOSURE

According to one embodiment, the method comprises: storing at said first radio node a hop-count number based on a hop-count number indicated in the second signal detected at the first radio node; and deciding whether to transmit the first signal onwards from said first radio node at least partly on the basis of (a) a hop-count number direction indicator in said first signal detected at the first radio node and (b) a comparison of (i) said hop-count number stored at the first radio node and (ii) the hop-count number included in the first signal detected at the first radio node.

According to one embodiment, the method comprises transmitting the second signal from the first radio node with an incremented hop-count number.

According to one embodiment, the hop-count number stored at the radio network node is said hop-count number indicated in the second signal detected at the first radio node incremented by one or other fixed value.

According to one embodiment, the method comprises transmitting the first signal from said first radio node after expiry of a wait time interval without detection at said first radio node of further transmission of said first signal in the direction indicated by said hop-count number direction indicator.

According to one embodiment, the second signal is a timing signal, and comprising transmitting the timing signal from said first radio node after expiry of a wait time interval without detection at said first radio node of further transmission of a timing signal in the same timing signal sequence with the same or higher hop-count number.

According to one embodiment, the hop count number is only stored at the first radio node in response to first detecting a timing signal in a timing signal sequence.

According to one embodiment, the method comprises detecting and retransmitting the first signal without changing the hop-count number stored at the radio network node.

According to one embodiment, said wait time interval has a randomly selected length.

According to one embodiment, the method comprises detecting and/or transmitting radio signals at said first radio node during relatively short active intervals between relatively long inactive intervals.

According to one embodiment, the method comprises dynamically varying the relative length of said active and inactive intervals at least partly on the basis of a change in the amount of power available from a power source for the first radio node.

According to one embodiment, said power source is an energy harvesting device.

According to one embodiment, the second signal is a timing signal, and the method comprises using the timing information included in the timing signal to synchronise switching between radio transmission frequencies with other radio nodes.

According to one embodiment, the first signal includes data encrypted according to an encryption key selected from a table of encryption keys by the originator of the first signal on the basis of an index included in the second signal and according to an index mapping relationship associated with the originator of the first signal.

According to one embodiment, said first radio node is mounted on a railcar of a train including other radio nodes on other railcars.

There is also provided an apparatus comprising: a processor and memory including computer program code, wherein the memory and computer program code are configured to, with the processor, cause the apparatus to: detect at a first radio node a first signal indicating the number of hops at which a second radio node that transmitted the first signal first detected a second, earlier signal; and decide whether to transmit said first signal onwards from said first radio node based at least partly on (i) a direction indicator in said first signal, and (ii) a comparison of the respective numbers of hops at which said first and second radio nodes first detected said earlier second signal.

According to one embodiment, the memory and computer program code are further configured to, with the processor, cause the apparatus to: store at said first radio node a hop-count number based on a hop-count number indicated in the second signal detected at the first radio node; and decide whether to transmit the first signal onwards from said first radio node at least partly on the basis of (a) a hop-count number direction indicator in said first signal detected at the first radio node and (b) a comparison of (i) said hop-count number stored at the first radio node and (ii) the hop-count number included in the first signal detected at the first radio node.

According to one embodiment, the memory and computer program code are further configured to, with the processor, cause the apparatus to transmit the second signal from the first radio node with an incremented hop-count number.

According to one embodiment, the hop-count number stored at the radio network node is said hop-count number indicated in the second signal detected at the first radio node incremented by one or other fixed value.

According to one embodiment, the memory and computer program code are further configured to, with the processor, cause the apparatus to: transmit the first signal from said first radio node after expiry of a wait time interval without detection at said first radio node of further transmission of said first signal in the direction indicated by said hop-count number direction indicator.

According to one embodiment, the second signal is a timing signal, and wherein the memory and computer program code are further configured to, with the processor, cause the apparatus to transmit the timing signal from said first radio node after expiry of a wait time interval without detection at said first radio node of further transmission of a timing signal in the same timing signal sequence with the same or higher hop-count number.

According to one embodiment, the memory and computer program code are further configured to, with the processor, cause the apparatus to only store a hop count number at the first radio node in response to first detecting a timing signal in a timing signal sequence.

According to one embodiment, the memory and computer program code are further configured to, with the processor, cause the apparatus to detect and retransmit the first signal without changing the hop-count number stored at the radio network node.

According to one embodiment, said wait time interval has a randomly selected length.

According to one embodiment, the memory and computer program code are further configured to, with the processor, cause the apparatus to detect and/or transmit radio signals at said first radio node during relatively short active intervals between relatively long inactive intervals.

According to one embodiment, the memory and computer program code are further configured to, with the processor, cause the apparatus to dynamically vary the relative length of said active and inactive intervals at least partly on the basis of a change in the amount of power available from a power source for the first radio node.

According to one embodiment, said power source is an energy harvesting device.

According to one embodiment, the second signal is a timing signal, and wherein the memory and computer program code are further configured to, with the processor, cause the apparatus to use the timing information included in the timing signal to synchronise switching between radio transmission frequencies with other radio nodes.

According to one embodiment, the first signal includes data encrypted according to an encryption key selected from a table of encryption keys by the originator of the first signal on the basis of an index included in the second signal and according to an index mapping relationship associated with the originator of the first signal.

According to one embodiment, said first radio node is mounted on a railcar of a train including other radio nodes on other railcars.

According to one embodiment, the apparatus further comprises a sensor for monitoring one or more parameters of one or more moving parts of the railcar, and wherein said first signal comprises information about a result of monitoring via a sensor at another railcar one or more parameters of one or more moving parts of said another railcar.

According to one embodiment, the apparatus further comprises an energy harvesting device for harvesting electrical energy from the vibrations of one or more moving parts of the railcar.

There is also hereby provided a train including a plurality of railcars each provided with one or more apparatuses as described above, and a railcar provided with an apparatus for originating said second signal.

There is also hereby provided a program product comprising program code means which when loaded into a computer controls the computer to: detect at a first radio node a first signal indicating the number of hops at which a second radio node that transmitted the first signal first detected a second, earlier signal; and decide whether to transmit said first signal onwards from said first radio node based at least partly on (i) a direction indicator in said first signal, and (ii) a comparison of the respective numbers of hops at which said first and second radio nodes first detected said earlier second signal.

BRIEF DESCRIPTION OF THE DRAWINGS

An embodiment of the invention is described in detail hereunder, by way of example only, with reference to the accompanying drawings, in which.

DETAILED DESCRIPTION OF THE PREFERRED EMBODIMENTS

An embodiment of the invention is described in detail below for the example of transferring data between any one of a reconfigurable train of railcars and a data concentrator/master apparatus located at one of the railcars. However, the same kind of technique is also applicable to the transfer of data in other situations.

Figure 1:
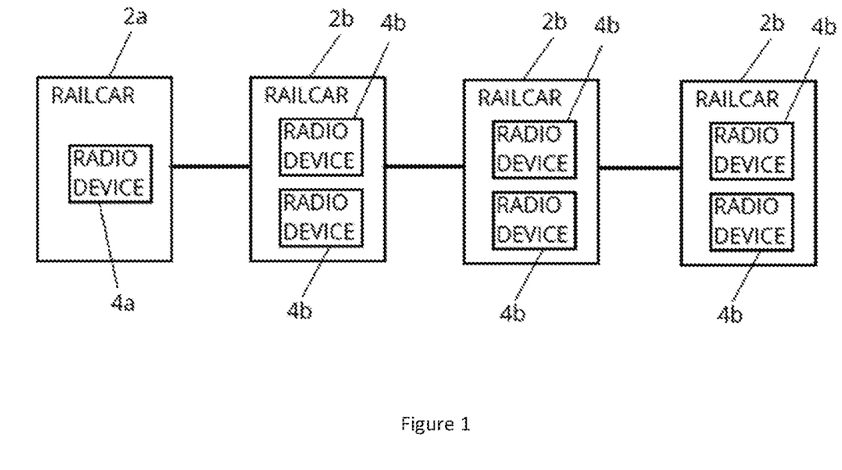
FIG. 1 illustrates a simple example of a set of radio nodes.

FIG. 1 illustrates a simple train of railcars 2, each equipped with one or more radio devices 4 for making and detecting/decoding radio transmissions. For simplicity, FIG. 1 only shows four railcars 2 but a train can include hundreds of railcars. One radio device 4a on one of the railcars 2a functions as a data concentrator/master device.

Figure 2:
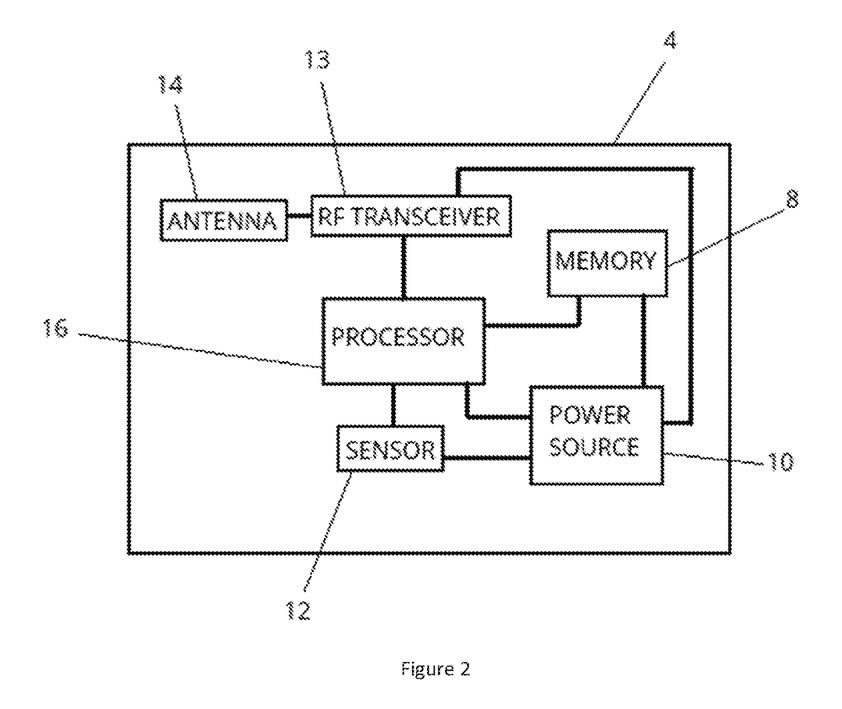
FIG. 2 illustrates an example of apparatus for each radio node of FIG. 1.

Each radio device 4 includes a data processor 16 which operates in accordance with instructions stored as computer program code at memory 8, and controls the generation and transmission of radio signals via RF transceiver 13 and antenna 14, and processes radio signals detected via RF transceiver 13 and antenna 14. The memory 8 may include both a RAM chip and a ROM chip. The radio device may also include a sensor 12 for making measurements of one or more operating parameters of the railcar such as vibration at the axle box and/or other key moving parts of the drive train. The radio device 4 also includes a power source 10 for powering all of the memory, processor, antenna and sensor. The power source 10 may, for example, be a battery or an energy harvesting device that harvests energy from the kinetic energy of one or more moving parts of the railcar, i.e. generates electrical energy from the movement of one or more moving parts of the railcar.

Figure 3:
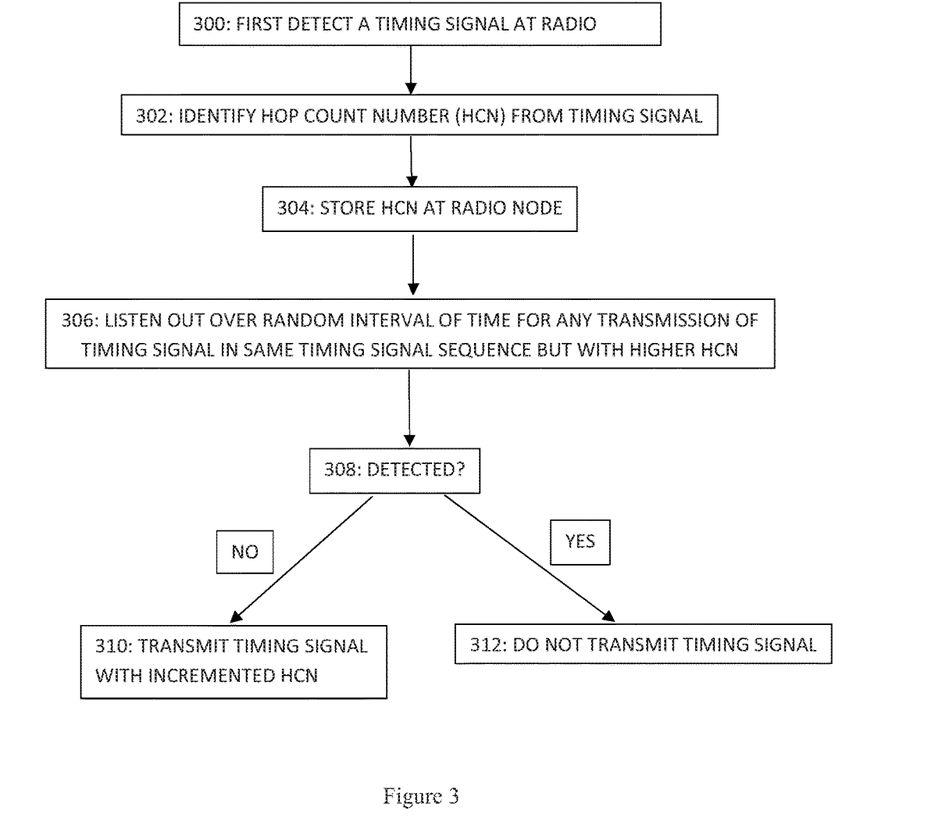
FIGS. 3 to 6 illustrate an example of operations at a radio node of FIG. 1 according to an embodiment of the invention.
Figure 4:
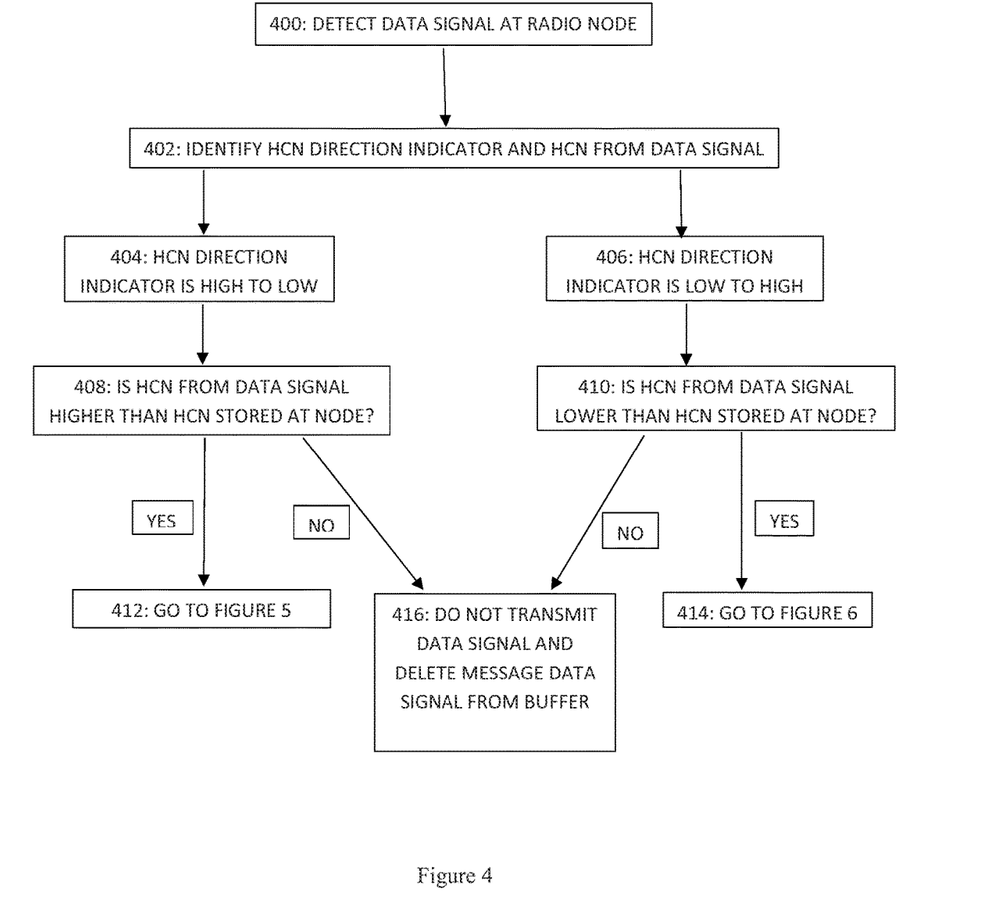

FIGS. 3 and 4 illustrate one example of operations at the radio device 4b at any one of the railcars 2. The technique begins with the data concentrator 4a transmitting a timing signal. The timing signal indicates the transmission time T at which the data concentrator 4a transmits the timing signal. The timing signal also indicates a hop-count number (HCN)=1. When a processor 16 at any one of the radio devices 4b detects (STEP 300 of FIG. 3) the timing signal via RF transceiver 13 and antenna 14 (the timing signal transmitted by the data concentrator 4a may be detected by the processors 16 at more than one radio device 4b at one or more of the railcars 2b), the processor 16 identifies the HCN included in the timing signal (STEP 302 of FIG. 3) and stores the HCN in local memory (STEP 304 of FIG. 3). The processor 16 then starts a random wait timer, and listens out via RF transceiver 13 and antenna 14 for a timing signal in the same timing signal sequence but with a higher HCN (STEPS 306 and 308). If the random wait timer (randomly selected duration of wait time) expires without the processor 16 having detected a timing signal in the same timing signal sequence but with a higher HCN, the processor 16 transmits the timing signal via RF transceiver 13 and antenna 14 (STEP 310). The timing signal transmitted by the processor 16 indicates (a) an incremented HCN (in this example, the increment is one (i.e. HCN=1+1=2) but could be another fixed value in other examples), and (b) the sum of the transmission time T in the original timing signal and the time period ($\Delta$T1) between detecting the original timing signal at the processor 16 and transmitting the timing signal from the radio device 4b. On the other hand, if the processor 16 does detect a timing signal in the same timing signal sequence with higher HCN before the random wait timer expires (which earlier transmission by another radio device can happen where another radio device has received the timing signal and has onwards transmitted the timing signal upon expiry of its own respective random wait timer, that happened to be shortest in duration among all the radio devices that received the same timing signal including the same HCN), the processor 16 does not itself transmit the timing signal (STEP 312 of FIG. 3).

This technique of using a wait timer with different wait times at different radio devices prevents unnecessary transmission of the same timing signal by more than one radio device, and better facilitates the use of relatively low power energy harvesting devices as the power sources for the radio devices. In more detail: because the wait time is randomly selected at a radio device each time the respective random wait timer is started, the probability that a given radio device may have the shortest wait time for the onwards transmission of a timing signal (i.e. the probability that a given radio device becomes the radio device that onward transmits the timing signal) will be equal for all radio devices that start their random wait timers at substantially the same time. Consequently, the result is that the task of onward transmitting data signals is equally shared among the radio devices without any complex co-ordination of the radio devices, and the power load on any one radio device is significantly no higher than the power load on any of the other radio devices.

When a processor 16b at any one of the radio devices 4 at which the timing signal with HCN=1 was not detected (because of local radio conditions etc.) detects via RF transceiver 13 and antenna 14 the timing signal with HCN=2, the processor 16 follows the procedure described above and illustrated in FIG. 3. Any transmission of the timing signal by a processor at such a radio device 4b would, in this example, include a plus-one-incremented HCN (i.e. HCN=2+1=3) and would indicate the sum of the time sum (T+$\Delta$T1) from the detected timing signal and the time period ($\Delta$T2) between detecting the HCN=2 timing signal at the processor 16 and transmitting the HCN=3 timing signal.

The timing signal with HCN=2 may also be detected at one or more radio devices 4 that detected the timing signal with HCN=1, but the processors 16 are configured to take no action in respect to timing signals detected with an HCN value that is higher than that of a previously received timing signal already detected at the processor 16 in the same sequence of timing signal transmissions. The processor 16 does not store the higher HCN, and does not transmit a timing signal with incremented HCN. The sequence of timing signal transmissions continues until a timing signal is no longer detected by any radio device that has not already detected a timing signal earlier in the sequence. This sequence of timing signals also enables each processor to synchronise their time with the data concentrator and therefore with the processors 16 at every other radio device of every other railcar of the train. This synchronisation in turn facilitates the use of a strictly defined transmit/receive/repeat windows for the transfer of data signals along the train (as discussed below), and may also facilitate synchronised frequency hopping.

When a processor 16 at a radio device 4 has data (such as measurement reports) to send to the data concentrator 4a, or the processor 16 at data concentrator 4a has data to send along the train: the processor 16 generates a data signal including the HCN locally stored at the processor (see above and FIG. 3) and a HCN direction indicator indicating how processors 16 detecting the data signal at other radio devices 4b should process the data signal; and transmits the data signal via RF transceiver 13 and antenna 14 in a transmit time window. The processor 16 at the data concentrator 4a always includes the same HCN (e.g. HCN=1) in data signals generated and transmitted by the data concentrator 4a.

Figure 5:
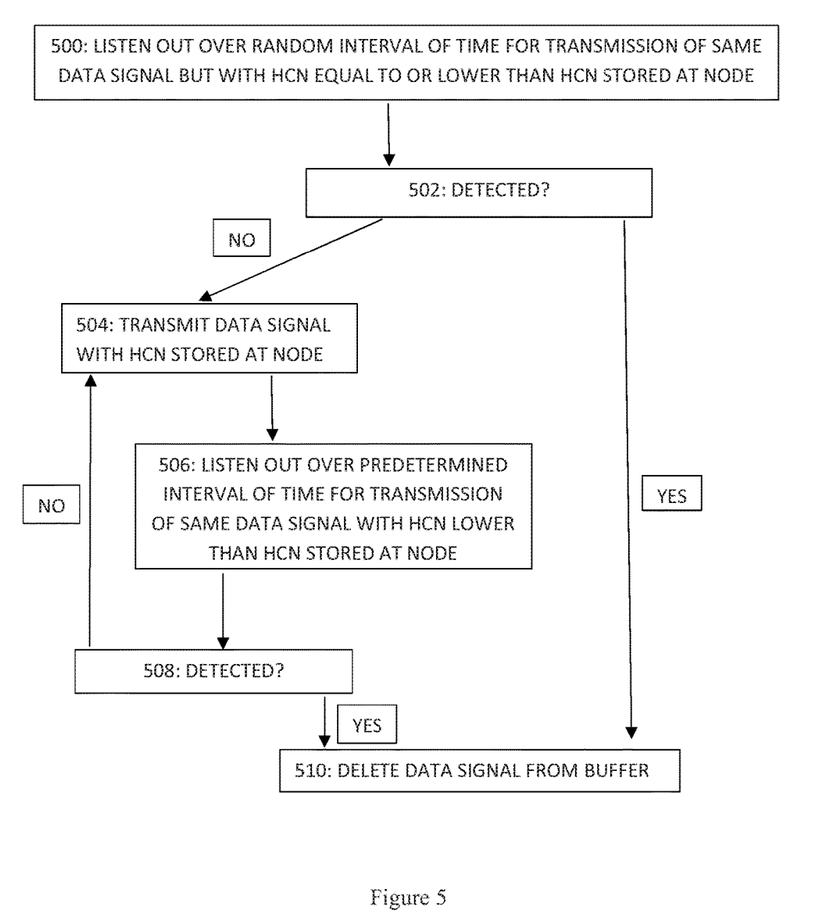

All processors 16 that detect the data signal via their respective RF transceivers 13 and antennas 14 (STEP 400 of FIG. 4) identify the HCN and HCN direction indicator included in the data signal (STEP 402 of FIG. 4). If, for example, a processor 16 identifies a high-to-low HCN direction indicator in the data signal (STEP 404), the processor 16 takes no action and deletes the data signal from its buffer (STEPS 408 and 416) unless the HCN in the data signal is higher than the HCN locally stored at the processor 16. If on the other hand, the HCN in the data signal is higher than the HCN locally stored at the processor 16 (STEPS 408 and 412), the processor 16 starts a random wait timer and listens out via RF transceiver 13 and antenna 14 for transmission of the same data signal but with a HCN equal to or lower than the HCN stored at the processor 16 (STEP 500). If the processor 16 detects such data signal, the processor 16 does not itself transmit the data signal and deletes the data signal from its buffer (STEP 510). On the other hand, if the random wait timer expires without such data signal having been detected by the processor 16, the processor transmits the data signal with the HCN locally stored at processor 16 (STEP 504), starts a predetermined interval timer and listens out for transmission of the same data signal with a HCN lower than that stored locally at processor 16 (STEP 508). If the processor 16 detects such data signal via RF transceiver 13 and antenna 14, the processor 16 has confirmation that the data signal has moved further down the train in the direction indicated by the HCN direction indicator, and deletes the data signal from its buffer (STEP 510). If the timer expires without the processor 16 having detected such data signal, the processor 16 retransmits the data signal via RF transceiver 13 and antenna 14.

Figure 6:
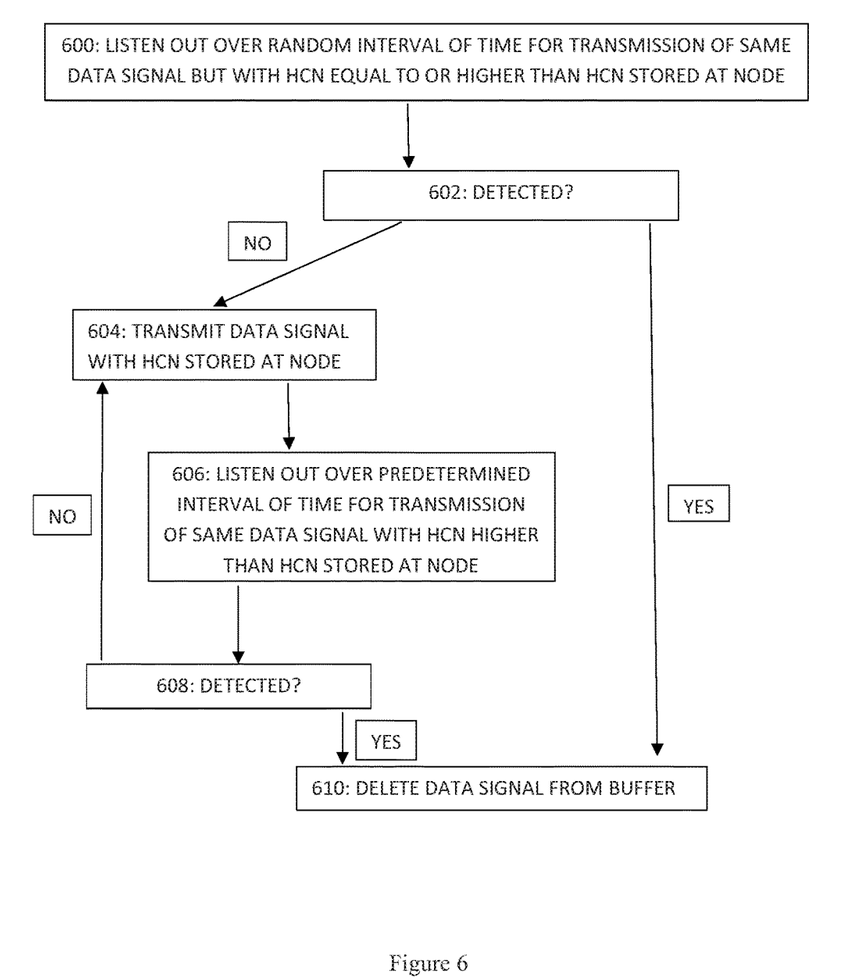

Similarly, in the event that a processor 16 identifies a low-to-high HCN direction indicator in the data signal (STEP 406), the processor takes no action and deletes the data signal from its buffer (STEPS 410 and 416) unless the HCN in the data signal is lower than the HCN locally stored at the processor 16. If the HCN in the data signal is lower than the HCN locally stored at the processor 16 (STEPS 410 and 414), the processor 16 starts a random wait timer and listens out via RF transceiver 13 and antenna 14 for transmission of the same data signal but with a HCN equal to or higher than the HCN stored locally at the processor (STEP 600), which earlier transmission by another radio device can happen where another radio device has received the same data signal including the same HCN and has onwards transmitted the data signal upon expiry of its own respective random wait timer, that happened to be shortest in duration among all the radio devices that received the same data signal including the same HCN. If the processor 16 detects such data signal, the processor 16 has confirmation that the data signal has already moved further down the train in the direction indicated by the HCN direction indicator, and does not itself transmit the data signal and deletes the data signal from its buffer (STEP 610). On the other hand, if the random wait timer expires without such data signal having been detected by the processor 16, the processor 16 transmits the data signal with the HCN locally stored at processor 16 (STEP 504), starts a predetermined interval timer and listens out for transmission of the same data signal with a HCN higher than that stored locally at processor 16 (STEP 508). If the processor 16 detects such data signal via RF transceiver 13 and antenna 14, the processor 16 has confirmation that the data signal has moved further down the train in the direction indicated by the HCN direction indicator, and deletes the data signal from its buffer (STEP 510). If the timer expires without the processor 16 having detected such data signal, the processor 16 retransmits the data signal via antenna 14.

As mentioned above for the onwards transmission of timing signals, this technique of using a wait timer with different wait times at different radio devices prevents unnecessary transmission of the same data signal by more than one radio device, and better facilitates the use of relatively low power energy harvesting devices as the power sources for the radio devices. In more detail: because the wait time is randomly selected at a radio device each time it starts its own random wait timer, the probability that a given radio device may have the shortest wait time for the onwards transmission of a data signal (i.e. the probability that a given radio device becomes the radio device that onward transmits the data signal) will be equal for all radio devices that start their random wait timers at substantially the same time. Consequently, the result is that the task of onward transmitting data signals is equally shared among the radio devices without any complex co-ordination of the radio devices, and the power load on any one radio device is significantly no higher than the power load on any of the other radio devices.

This repeated transmission of the data signal with increasingly lower or higher HCNs continues until the data signal arrives at the data concentrator (in the case of path beginning with STEP 404) or the data signal is detected by the processor 16 with the highest locally stored HCN (in the case of path beginning with STEP 406).

The radio devices 4 do not make any change to their locally stored HCN in response to detecting data signals. The radio devices 4b may only update the locally stored HCN based on the HCN in the first detected timing signal of any timing signal sequence.

Each radio device 4b adds its own sensor data to the data stream at a lower rate than the rate at which data signals are repeated in the network comprising the group of radio devices 4 on the train of railcars 2.

The transmission of timing signals by the data concentrator (i.e. the triggering of respective sequences of transmission signals along the train away from the data concentrator) is repeated at regular intervals e.g. at intervals of 10 seconds, and the number of hops at which any processor 16 first detects a timing signal may change depending on radio conditions, changes in the train configuration (such as can occur when the train follows a bend in the track, or following the addition or removal of railcars to/from the train) etc. With each new timing signal sequence, a processor 16 resynchronises time with the data concentrator 4a, updates the HCN locally stored at the processor 16 and uses the updated HCN to decide/control actions at the processor 16 when subsequently detecting data signals, as described above.

As mentioned above, there will typically be within the detection range of one radio device 4b having any given HCN a number of radio devices 4 having a different HCN following the HCN direction indicator, and this helps to ensure that data is detected at at least one such radio device and effectively propagated along the train even if the performance of some radio devices 4 is not optimal because, for example, of a temporary lack of power from the power source 10. The actual route of radio devices (nodes) taken by each data signal and each timing signal is automatically determined by local radio transmission conditions and the above-described random wait time.

The above-described technique does not require explicit configuration of the network by a centralised management entity to optimise network topology, and does not require more than a single timing cycle to adjust for changes in radio conditions, train configuration etc. Additionally, no routing information such as routing tables needs to be stored at the radio devices 4b, and the data signals do not need to include any addressing information other than the HCN direction indicator.

As mentioned above, the radio devices may be powered by energy harvesting devices, which may be characterised by variations in the amount of power available at any given time. For example, the ratio of radio operating time (active time) to radio-off time (inactive time) for any radio device 4 at any given time may be determined by the amount of harvester energy available at that time. For example, the radio operating time might have a duration of 250 ms at intervals of is (i.e. a radio-off time of 750 ms per second, i.e. an on/off ratio of 1:3; but this ratio could be independently changed at any radio device 4 according to changes in the amount of harvester energy available to that radio device 4.

Each radio device 4 in the train may generate and transmit a data signal indicating a unique identification number associated with the radio device, by which an operator can verify which railcars (vehicle assets) are together in which train, by mapping the radio device ID numbers received from the data concentrator 4a via a network cloud to railcar ID numbers. An online (web based) representation of the train can thus be constructed.

The timing signals may include an identification number for the data concentrator from which they originate, which identification number may be used by the processors 16 at the radio device 4 to check that they are not mistakenly detecting timing signals transmitted by other data concentrator(s) for other train(s). In the event of a change in the composition of a train (i.e. a change in data concentrator for any given railcar), the data concentrator 4a for the train may wait until the train is in motion and sufficiently distanced from any other train (data concentrator) before transmitting a timing signal. Also, the processors 16 at the radio devices 4 may be configured to ignore timing signals indicating a new data concentrator ID until they detect a minimum of two timing signals indicating the new data concentrator ID without any intervening detection of timing signals indicating any other data concentrator ID. These precautionary measures reduce the risk of processors 16 in the train detecting and acting on timing signals from other data concentrators on other trains.

The data signals may include information about the detection of mechanical defects in rotating components of the railcar (e.g. gearbox, wheels, axles, motors) from e.g. changes in the vibration spectra and/or temperature changes measured at the sensor 12. A single railcar may include a plurality of radio devices 4, each radio device monitoring a different moving part of the same railcar.

The data signals transmitted by the data concentrator may include information to assist the processors 16 in detecting events for reporting to the data concentrator. For example, this information may include vibration or temperature characteristics for one or more of the gearbox, wheel, axle bearing or motor at one or more of the railcars, by which information the processor can better locally determine abnormal changes in vibration spectra/temperature measurements that need reporting to the data concentrator.

The data signals may include an indication that the data signal includes urgent information, such as information about the detection of an abnormally rapid increase in temperature. For example, a priority bit in a header portion of the data signal may be used to accelerate passage of the data signal to the data concentrator.

The data signals may include header portions indicating a message sequence number and timestamp to enable identification of a set of data signals from the same radio apparatus at the same node (railcar). The message sequence number may be used to identify malicious data transmissions or validate collection efficiency.

The data signals may be encrypted such that only those processors 16 at railcars with the necessary encryption/decryption information can correctly decrypt detected data signals. For example, a train may comprise railcars belonging to more than one customer, and a unique sequence of encryption keys may be used for each customer. A table of encryption keys may be locally stored at each radio apparatus 4, and the mapping relationship between an index value broadcast by the data concentrator 2a and a specific encryption key in the table may be different depending on the customer to which the railcar belongs.

In the example described above, each radio device stores the HCN included in the timing signal that it first detects in a timing signal sequence. In other variations, each radio device 4 stores a HCN value based in a common, predetermined way on the HCN included in the timing signal that it first detects in a timing signal sequence. For example, each radio device 4 may store the incremented HCN value to be included in any onwards transmission of the first-detected timing signal by the first radio node (i.e. HCN+1 in the example described above).

In one embodiment, each radio device is configured to go to sleep (i.e. stop all detection and transmission of radio signals) after the lapse of a predetermined period without detecting any timing signal, and to only wake up at relatively long periods (e.g. once every 30 minutes) to check for the transmission of timing signals.

In one example, the functions of at least the memory 8, sensor 12, RF transceiver 13, antenna 14 and processor 16 may all be implemented in a single microcontroller unit (MCU) package, such as e.g. EFM32 MCU package produced by Energy Micro, NXP LPC54102 MCU package produced by NXP and STM32L476 MCU package produced by ST Micro. The power source 10 may be a vibration energy harvester used in existing wireless sensor products available from Perpetuum Limited, such as Product No. 72102.

In one example, each radio transmission made by any of the radio devices has a radio frame format comprising the following octets. Octets 0 to 7 commonly contain a standard binary bit sync pattern such as 10101010, which allows the data slicer in the transceiver 13 to ascertain a centre level for discriminating between a 1 and a 0 level. Octets 8 and 9 contain the binary Sync Word 0x2D, 0xD4 (00101101, 11010100). Octet 10 contains the octet count of the following message. Octets 11 to 25 contain the routing and control header. Octets 26 and 27 contain a message ID and octet count. Octets 28 to 63 contain any payload associated with the indicated message ID.

According to one example, the message header comprises the following values (all unsigned): Total Frame Length (8 bits); Flag (8 bits); Hop Count Number, Bogie ID and more flags (if needed) (shared over 16 bits); Sender MAC (32 bits); Target MAC (32 bits); and Sequence number (16 bits).

According to one example, the above-described timing information included in the timing signal comprises an unsigned 32 bit TIME value indicating the number of seconds since a predetermined moment in time (e.g. 00:00:00 on Jan. 1, 2010) and indicating the data concentrator time at which the timing signal was transmitted; and an unsigned 16 bit OFFSET value containing the sum of the number of micro seconds between detection and transmission at one or more hop nodes. This timing information may be arranged as follows.

| | |
|---|---|
| arr[0] | Message ID |
| arr[1] | Message Length in bytes |
| arr[2] | TIME(Bits 31-24) |
| arr[3] | TIME(Bits 23-16) |
| arr[4] | TIME(Bits 15-8) |
| arr[5] | TIME(Bits 7-0) |
| arr[6] | OFFSET(Bits 15-8) |
| arr[7] | OFFSET(Bits 7-0) |

The low network complexity enabled by the use of energy harvesting in the technique described above makes it possible to support a much larger number of nodes than was possible with conventional techniques. For example, the technique can be used to (i) support more than 3000 nodes on the largest freight trains, and (ii) support nodes for each of the more than 276 sensors that can be used on long passenger trains.

In addition to the modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

The invention claimed is:

1. A method comprising: storing at a first radio node a hop-count number based on a hop-count number indicated in a second signal detected at the first radio node; detecting at the first radio node a first signal indicating the number of hops at which a second radio node that transmitted the first signal first detected the second signal; and deciding whether to transmit the first signal onwards from said first radio node at least partly on the basis of (a) a hop-count number direction indicator in said first signal detected at the first radio node; (b) a comparison of (i) said hop-count number stored at the first radio node and (ii) the hop-count number included in the first signal detected at the first radio node; and (c) the result of a search at said first radio node for onwards transmission of said first signal by another radio node in the direction indicated by said hop-count number direction indicator.

2. The method according to claim 1, further comprising transmitting the second signal from the first radio node with an incremented hop-count number.

3. The method according to claim 1, wherein the hop-count number stored at the radio network node is said hop-count number indicated in the second signal detected at the first radio node incremented by one or other fixed value.

4. The method according to claim 1, comprising: transmitting the first signal from said first radio node after expiry of a wait time interval without detection at said first radio node of further transmission of said first signal in the direction indicated by said hop-count number direction indicator.

5. The method according to claim 4, comprising detecting and retransmitting the first signal without changing the hop-count number stored at the radio network node.

6. The method according to claim 4, wherein said wait time interval has a randomly selected length.

7. The method according to claim 6, comprising detecting and/or transmitting radio signals at said first radio node during relatively short active intervals between relatively long inactive intervals.

8. The method according to claim 7, comprising dynamically varying the relative length of said active and inactive intervals at least partly on the basis of a change in the amount of power available from a power source for the first radio node.

9. The method according to claim 8, wherein said power source is an energy harvesting device.

10. The method according to claim 1, wherein the second signal is a timing signal, and comprising transmitting the timing signal from said first radio node after expiry of a wait time interval without detection at said first radio node of further transmission of a timing signal in the same timing signal sequence with the same or higher hop-count number.

11. The method according to claim 10, wherein a hop count number is only stored at the first radio node in response to first detecting a timing signal in a timing signal sequence.

12. The method according to claim 1, wherein the second signal is a timing signal, and comprising using the timing information included in the timing signal to synchronise switching between radio transmission frequencies with other radio nodes.

13. The method according to claim 1, wherein the first signal includes data encrypted according to an encryption key selected from a table of encryption keys by the originator of the first signal on the basis of an index included in the second signal and according to an index mapping relationship associated with the originator of the first signal.

14. The method according to claim 1, wherein said first radio node is mounted on a railcar of a train including other radio nodes on other railcars.

15. An apparatus comprising: a processor and memory including computer program code, wherein the memory and computer program code are configured to, with the processor, cause the apparatus to: store at a first radio node a hop-count number based on a hop-count number indicated in a second signal detected at the first radio node; detect at a first radio node a first signal indicating the number of hops at which a second radio node that transmitted the first signal first detected a second, earlier signal; and decide whether to transmit said first signal onwards from said first radio node based at least partly on the basis of (a) a hop-count number direction indicator in said first signal detected at the first radio node, (b) a comparison of (i) said hop-count number stored at the first radio node and (ii) the hop-count number included in the first signal detected at the first radio node, and (c) the result of a search at said first radio node for onwards transmission of said first signal by another radio node in the direction indicated by said hop-count number direction indicator.

16. The apparatus according to claim 15, wherein said first radio node is mounted on a railcar of a train including other radio nodes on other railcars.

17. The apparatus according to claim 16, further comprising a sensor for monitoring one or more parameters of one or more moving parts of the railcar, and wherein said first signal comprises information about a result of monitoring via a sensor at another railcar one or more parameters of one or more moving parts of said another railcar.

18. The apparatus according to claim 16 further comprising an energy harvesting device for harvesting electrical energy from the vibrations of one or more moving parts of the railcar.

19. A train including a plurality of railcars each provided with one or more apparatuses according to claim 15, and a railcar provided with an apparatus for originating said second signal.

20. A non-transitory computer readable medium comprising program code which when loaded into a computer controls the computer to: store at a first radio node a hop-count number based on a hop-count number indicated in a second signal detected at the first radio node; detect at the first radio node a first signal indicating the number of hops at which a second radio node that transmitted the first signal first detected the second signal; and decide whether to transmit said first signal onwards from said first radio node based at least partly on the basis of (a) a hop-count number direction indicator in said first signal detected at the first radio node, (b) a comparison of (i) said hop-count number stored at the first radio node and (ii) the hop-count number included in the first signal detected at the first ratio node, and (c) the result of a search at said first radio node for onwards transmission of said first signal by another radio node in the direction indicated by said hop-count number direction indicator.

* * * * *